Figure 3:
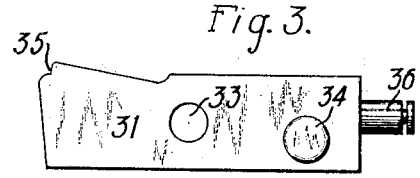

A. J. HALL.
CONTROLLER.
APPLICATION FILED APR. 25, 1914.

1,306,536.

Patented June 10, 1919.
3 SHEETS—SHEET 1.

WITNESSES:
A. J. Fitzgerald
W. R. Coley

INVENTOR
Arthur J. Hall
BY
Wesley Carr
ATTORNEY

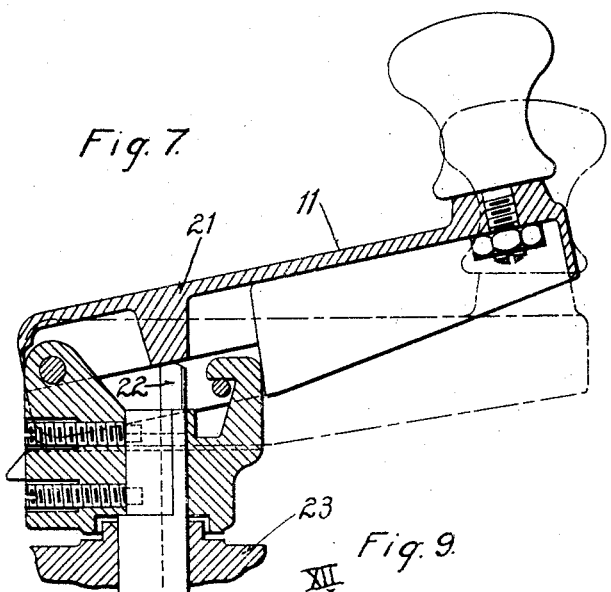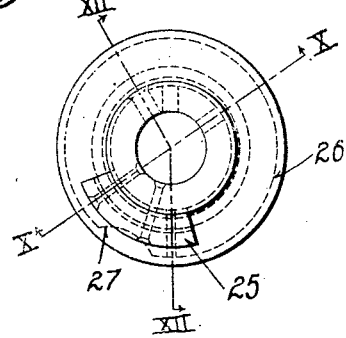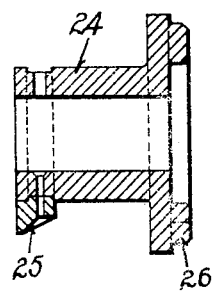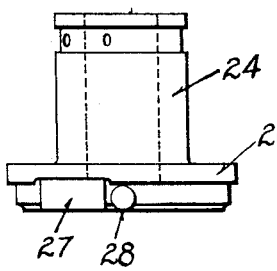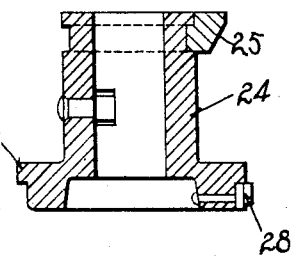

A. J. HALL.
CONTROLLER.
APPLICATION FILED APR. 25, 1914.

1,306,536.

Patented June 10, 1919.
3 SHEETS—SHEET 3.

WITNESSES:
R. J. Fitzgerald
W. R. Coley

INVENTOR
Arthur J. Hall.
BY
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROLLER.

1,306,536.     Specification of Letters Patent.     Patented June 10, 1919.

Application filed April 25, 1914. Serial No. 834,546.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Controllers, of which the following is a specification.

My invention relates to controllers for electric motors, and it has special reference to apparatus of the master controller type that is adapted for use in multiple unit control systems and the like.

One object of my invention is to provide an apparatus of the above-indicated character that shall embody certain new and desirable features whereby safe, reliable and economical operation is obtained at a relatively low cost of construction.

More specifically stated, the object of my invention is to provide a simple and durable construction of the "dead-man's release" type, whereby the electrical circuit of the controller is automatically broken and the air brakes are set when the main control drum handle is relieved of downward pressure, in any operative position of the drum.

Another object of my invention is to provide means for allowing the rupture of the control circuit on both the main and the reversing drum, but for preventing the automatic setting of the vehicle brakes, when the main control drum is normally returned to its "off" position.

Another object of my invention is to provide means for permitting the operation of the main control drum with a much lighter downward pressure than has been permitted by former structures of the "dead-man's release" type, whereby the work of the train operators is materially lessened without sacrificing the rapid and effective automatic circuit breaking and brake-setting referred to above.

A further object of my invention is to provide a novel finger-base construction for the reversing drum, whereby the controller circuit is broken on both the main and the reversing drum when the main drum is moved to its "off" position, irrespective of the position occupied by the reversing drum, and whereby electrical circuit connections are made on both drums upon initial normal actuation of the main drum, that is, when the "dead man's handle" is held down.

In the prior art, apparatus of the "dead man's release" type that was adapted to automatically set the vehicle brakes by the operation of a suitable valve, has been of rather cumbersome construction, inasmuch as the brake-setting was accomplished directly by the action of the customary upwardly biasing spring of the "dead man's handle," thereby, in particular, requiring a relatively heavy spring and thus, forcing the train operator to continuously exert an irksomely heavy pressure on the handle during operation thereof. Moreover, certain parts of the mechanism for operating the "dead man's feature" were under constant strain or were subject to considerable wear.

According to my present invention, I provide a "dead man's release" of relatively light and inexpensive construction. A particularly novel feature of great importance is a control finger-base that is adapted to rotate about the reversing drum, and that is biased to an electrically inoperative position, contact being made on the reversing drum through the actuation of the finger-base by the rotation of the main drum. The finger-base is then held in its operative position by a suitable trigger member, thereby removing all further strain and wear on the initially actuated parts until the "dead man's handle" is released. When the pressure on the main drum handle is released, in any operative position of the main drum, the upwardly biasing spring actuates the trigger to allow the finger-base to return to its normal position. The movement of the finger base is adapted to set the brakes by the operation of a suitable valve. Thus, the biasing spring of the "dead man's handle" may be of relatively light construction, inasmuch as it is required only to trip the trigger member and raise the handle, and is not required to directly overcome the air-pressure; and consequently, a correspondingly lighter pressure may be exerted on the handle by the train operator.

The above and other novel structural features for accomplishing the recited objects will be hereinafter more fully described.

Figure 1:
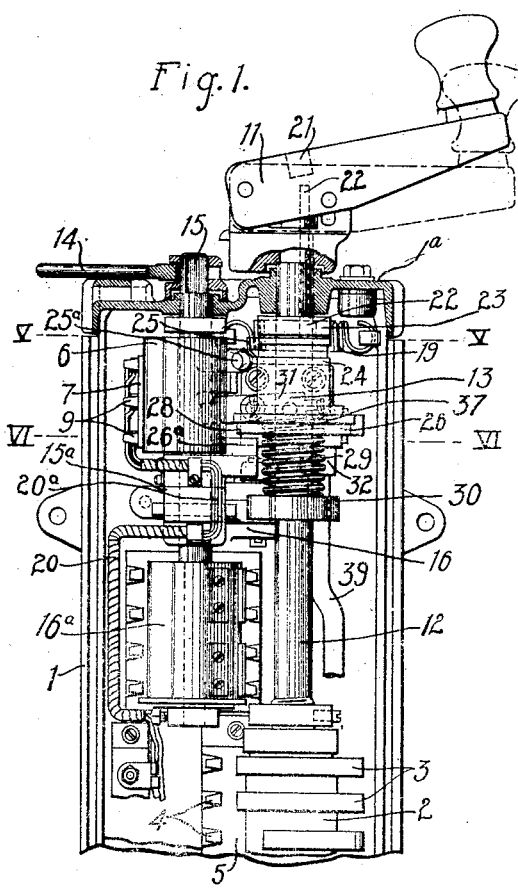
Figure 4:
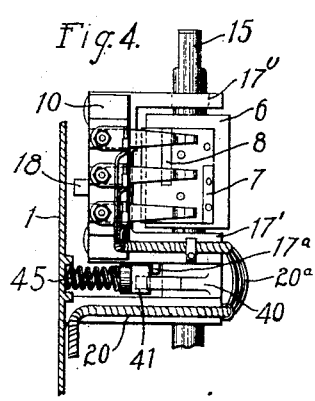
Figure 5:
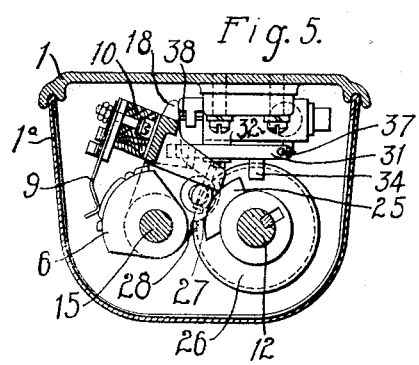
Figure 2:
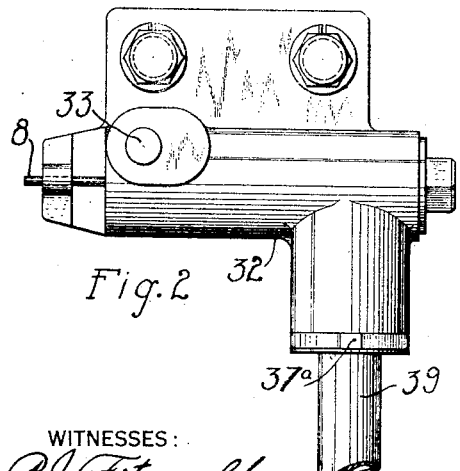
Figure 6:
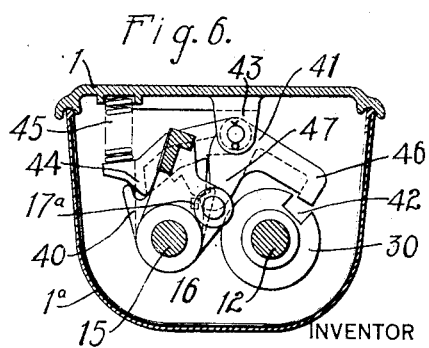
Figure 13:
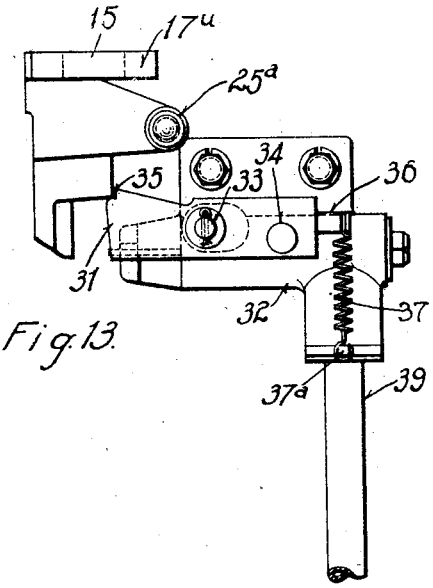
Figure 15:
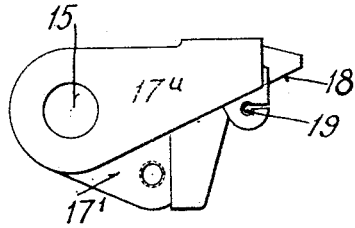
Figure 14:
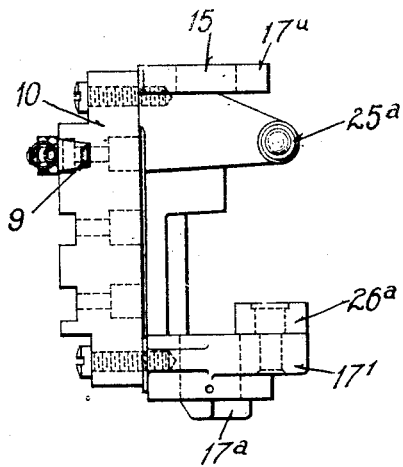
Figure 16:
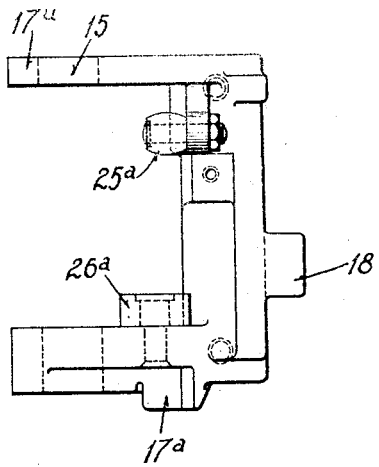

In the accompanying drawings, Figure 1 is a view, in front elevation, of a controller constructed in accordance with my invention, the cover being removed; Figs. 2 and 3 are enlarged views showing certain details of construction of the controller shown in Fig. 1; Fig. 4 is a view, in side elevation, of a portion of the controller structure illustrated in Fig. 1; Figs. 5 and 6 are sectional views taken respectively on the lines V—V and VI—VI of Fig. 1; Fig. 7 is a view in longitudinal section of my main controller-actuating handle; Figs. 8, 9, 11, 13, 14, 15, and 16 are views in elevations of various structural details of my controller; and Figs. 10 and 12 are views in longitudinal section taken on the lines X—X and XII—XII, respectively, of Fig. 9.

Referring to the drawings, the apparatus here shown comprises a suitable frame member 1, a cover 1ª, a main control drum 2 having a plurality of contact members 3 and provided with a plurality of control fingers 4 that are mounted on a stationary finger-base 5; a reversing drum 6 having a plurality of contact members 7 and 8, respectively corresponding to the forward and reverse operative positions of the drum and provided with a plurality of control fingers 9 which are mounted upon a finger base 10 that is adapted for rotative movement above the drum 6; a "dead-man's handle" 11 that is suitably secured to the operating shaft 12 of the main drum 2; a "dead-man's release" mechanism 13; a suitable operating lever 14 that is secured to the operating shaft 15 of the reversing drum 6; a mechanical interlocking mechanism 16 for the main and reversing drum; and an interlocking drum 16ª of familiar construction.

The rotatable finger base 10 is provided with an upper and a lower apertured arm 17ª and 17¹, respectively, through which the shaft 15 of the reversing drum loosely extends, and has a projecting boss 17ª on the lower arm 17¹ and a projecting lug or tongue 18, disposed on one side of the finger-base, for purposes to be hereinafter specified. A suitable spring 19 is attached to the frame 1 and the finger-base 10 for biasing the latter to a predetermined and electrically inoperative position, and to cause the setting of the air-brakes, under predetermined conditions, as set forth later. Suitable control conductors 20 that have flexible portions 20ª, to allow rotative movement of the finger-base, are provided. The shaft 15 is suitably supported intermediate the drums 6 and 16ª by a bearing bracket 15ª.

The "dead-man's handle" 11 is provided with an internal projection 21 that is adapted to engage a key or feather 22 which is disposed within a groove in the main control drum shaft 12, for a purpose to be hereinafter described. The lower end of the key 22 is positioned by a recessed collar 23 that is fixedly supported by the shaft 12 and loosely rests upon a sleeve 24 that incloses the shaft and is provided with a segmental cam surface 25 at its upper end to engage a roller 25ª on the finger-base 10, under pre-determined conditions, and a cylindrical cam surface 26 at its lower end for engaging a second roller 26ª of the finger-base 10. The roller 26ª is adapted to rest within a recess 27 of the cam 26 when the main control drum 2 is in its "off" position, provided the handle 11 occupies its lower position, and a lug 28 is provided on the cam 26 adjacent to the recess 27, for a purpose to be hereinafter pointed out. A helical spring 29 of relatively light construction is disposed around the shaft 12 intermediate the lower end of the sleeve 24 and a collar 30 that is rigidly fixed on the shaft, the purpose of the spring 29 being to upwardly actuate the sleeve 24 and the mechanically associated parts, under predetermined conditions, as hereinafter set forth.

The "dead-man's release" mechanism 13 comprises an oscillating lever or trigger member 31 and a fluid pressure controlling member 32, together with certain portions of the structure already described. The trigger member 31 is pivotally mounted, at a point intermediate its ends, upon the fluid pressure controlling member 32, at 33, as indicated, and is provided with a transversely projecting pin 34 near one end and a notch or recess 35 at the other end thereof. A projecting lug 36 is secured to the end of the lever 31 near which the pin 34 is mounted, and a suitable biasing spring 37 is secured between the lug 36 and an ear 37ª of the fluid pressure controlling member 32. The trigger member 31 is thus biased to engage the finger-base 10, as hereinafter more fully described.

The fluid-pressure controlling member 32 may be of any well-known type and is provided with a projecting pin 38, at one end, for controlling the action of the inclosed valve member (not shown). A pipe 39 is connected to the member 32 and may be adapted for communication with the pneumatic braking system, or other devices that may be provided in the vehicle, in any suitable manner.

The mechanical interlocking device 16 comprises a notched member 40 of familiar construction that is rigidly secured to the shaft 15 and is provided with a plurality of notches respectively corresponding to the forward, "off" and reverse positions of the reversing drum 6, and a triple-armed interlocking member 41. The collar 30 is provided with a recess 42 for engaging the interlocking member 41, under predetermined conditions, as hereinafter described. The interlocking member 41 is pivotally mounted upon a lug 43 that is secured to the frame 1 and has one of its arms 44 biased by a spring 45 that acts between the arm 44 and the frame 1 to engage the notches in the notched member 40. The other end arm 46 is adapted to engage the recess 42, as hereinafter more fully set forth, and an intermediate arm 47 is located to engage the boss 17ª of the finger base 10, as more fully explained later.

Assuming the parts to be in the positions shown in Fig. 1, the operation of my controller may be described as follows: When the "dead-man's handle" 11 is pressed downwardly to the position indicated in dotted lines, the internal projection 21 engages the key or feather 22, which is guided by the collar 23 to move the sleeve 24 to its lower position against the action of the upwardly biasing spring 29. The cam surface 25 thereupon engages the roller 25ª, and the roller 26ª rests within the recess 27 of the cam surface 26. Because of the angular relation of engaging parts, the rotatable finger-base 10 is partially rotated to one of its electrically operative positions, and such rotation is completed upon the initial rotative movement of the handle 11 and the associated main control drum 2. Upon the forward actuation of the handle 11, the roller 26ª rides along the surface of the recess 27 and engages the small projecting lug 28. The finger-base 10 is thereby rotated a trifle beyond its final operative position, in order that the spring 37 may actuate the trigger member 31 in such manner as to have the notch 35 engage an adjacent portion of the control finger-base 10 and maintain it in its operative position against the action of the spring 19. The roller 26ª and the cam 26 are thus relieved of any further wear or pressure and, consequently, will require little attention and infrequent renewal. When the roller 26ª passes beyond the projection 28, the main control drum 2 may be rotated to any of its operative positions, in the customary manner, and may be returned to its off position without further actuating the "dead-man's release" mechanism 13, provided the handle 11 is maintained in its lower position.

However, if the pressure on the handle 11 is relieved the upwardly biasing spring 29 actuates the sleeve 24 and the handle 11 to their upper positions. During the upward movement of the sleeve 24, its cam surface 26 engages the pin 34 in the trigger member 31 in opposition to the action of the spring 37 and, consequently, actuates the trigger member in such manner that the notch 35 is disengaged from the control finger-base 10, and the spring 19 thereupon actuates the finger base to its "emergency" position. The lug or tongue 18 thereupon strikes the pin 38 of the fluid-pressure controlling member 32 and unseats the valve, as will be understood. The controller circuit is thus broken, both drums being rendered electrically inoperative, and the air brakes are automatically set, whenever the handle 11 is allowed to assume its upper position, provided the main control drum occupies any operative position. Before the controller can again become operative, the main control drum 2 must be returned to its off position, whereupon the finger-base 10 may be rotated to its electrically operative position, in the manner described above. It should be observed that, inasmuch as the spring 29 is required only to trip the trigger member 31 and lift the handle 11 against the force of gravity, a spring of materially lighter construction than has hitherto been feasible may be employed, and, consequently, the downward pressure on the handle 11 that is required to be exerted by the train operator is considerably lessened.

The purpose of the cam surface 25 is to engage the roller 25ª, when the main control drum is in its "off" position and the reversing drum occupies either of its operative positions, upon the downward movement of the handle 11, to slightly rotate the finger-base 10 into such a position that the pin 38 of the fluid-pressure controlling member 32 is entirely free from the tongue 18 of the finger base, thus preventing the operation of the brakes when the control drums occupy the respective positions just recited.

Assuming the mechanically interlocking devices 16 to occupy the forward position shown in Fig. 6, the operation thereof may be described as follows: If the reversing drum is moved to its "off" position, the arm 44 of the interlocking member 41 rides along the surface of the notched member 40 until it engages the intermediate notch thereof, which corresponds to the "off" position. The arm 46 is thereby rotated into engagement with the recess 42 of the collar 30 to prevent any movement of the main controller drum while the reversing drum occupies its "off" position. Simultaneously, the arm 47 engages the boss 17ª, as hereinafter described. If the reversing drum is moved to its reverse position, the arm 46 is again moved out of engagement with the recess 42, and operation of the main controller drum 2 is thereby permitted.

The purpose of the boss 17ª is two-fold. In the first place, by its engagement with the intermediate arm 47 of the interlocking member 41, the inoperative or biased position of the finger-base 10 is determined, and the arrangement of parts is such that the lug or tongue 18 of the finger-base is held away from the valve pin 38, when both the main and the reversing drum occupy the "off" positions.

In the second place, the actuation of the reversing drum from the "off" position to either the forward or the reverse position, causes first a slight clockwise and then a relatively great counter-clockwise movement of the interlocking member 41, as viewed in Fig. 6, by reason of the arm 44 riding over the one or the other edge of the intermediate notch of the notched member 40 toward the side recess thereof that corresponds to forward or reverse operation, as the case may be. Such initial clockwise movement of the interlocking member 41, causes a corresponding counter-clockwise movement of the finger-base 10 toward the operative position finally occupied by the contact member 7 or the contact member 8 of the reversing drum, when the drum is being actuated in the forward or in the reverse direction, respectively, by reason of the active engagement of the intermediate arm 47 of the interlocking member 41 with the boss 17$^a$.

I do not wish to be restricted to the specific structural details herein set forth, but desire that only such limitations shall be imposed as are indicated in the appended claims.

I claim as my invention:

1. A controller comprising a plurality of contact-making drums, a plurality of sets of control fingers therefor, means independent of the drums for retaining one of said sets in an operative position under predetermined conditions, means tending to actuate that set to a normal inoperative position, and means associated with one of said drums for rendering said retaining means inoperative and causing the electrical contact on the other drum to be broken by said tending means under other predetermined conditions.

2. A controller comprising a main control drum, a reversing drum, a plurality of sets of control fingers for said drums, a fluid-pressure controlling member, a stationary supporting base for the main drum control fingers, a movable supporting base for the reversing drum control fingers that is biased to a predetermined position, operating handles for said drums, means for automatically rendering said main drum electrically inoperative when its handle assumes a predetermined position, means included by said last means and actuated during said automatic operation to allow movement of said biased supporting base toward said predetermined position, and means secured to said base for thereupon operating said fluid-pressure controlling member.

3. A controller comprising a main control drum, a supporting shaft therefor, a reversing drum, a plurality of sets of control fingers for said drums, a fluid-pressure controlling member, a stationary finger-base for the main drum control fingers, a finger-base for the reversing drum control fingers rotatively mounted with respect to the drum, means for biasing said rotatable finger-base to an electrically inoperative position, an operating handle attached to the main drum shaft, a shaft-inclosing member disposed intermediate said main drum and said handle, means for upwardly biasing said shaft-inclosing member and said handle, means secured to said shaft-inclosing member for moving said rotatable finger-base to an electrically operative position upon the application of downward pressure to said handle and initial actuation of the main drum, means biased to thereupon lock said rotatable finger-base in said operative position, means secured to said last means and adapted to be engaged by said shaft-inclosing member upon upward movement thereof when said handle is relieved of pressure to unlock said rotatable finger-base and allow it to return to said inoperative position, and means secured to the rotatable finger-base for thereupon operating said fluid-pressure controlling member.

4. A controller comprising a main control drum, a reversing drum, sets of control fingers and supporting shafts for said drums, a fluid-pressure controlling member, a stationary finger-base for the main drum control fingers, a finger-base for the reversing drum control fingers having a plurality of apertured arms through which the reversing drum shaft loosely extends, a spring for biasing said rotatable finger-base to an electrically inoperative position, an operating handle attached to the main drum shaft, a sleeve disposed around said shaft intermediate said main drum and said handle, a helical spring disposed around the main drum shaft for upwardly biasing said sleeve and said handle, a cam surface secured to said sleeve for moving said finger-base to an electrically operative position upon the application of downward pressure to said handle and initial actuation of the main drum, a pivotally mounted lever biased to thereupon engage the finger-base and lock it in said operative position, a pin secured to said lever, said pin being operatively engaged by said sleeve upon upward movement thereof when said handle is relieved of pressure to unlock said finger-base, whereupon the associated spring returns it to said inoperative position, and a lug secured to the rotatable finger-base for operating said fluid-pressure controlling member upon the actuation of the finger-base.

5. The combination with a movable controller drum and a set of control fingers therefor, of a longitudinally-extending finger-base for said fingers rotatively mounted with respect to said drum, and means for biasing said finger-base to a predetermined position.

6. The combination with a rotatable controller drum provided with an operating shaft, and a set of control fingers for said drum, of a finger-base for said fingers that is provided with a plurality of apertured arms through which said shaft extends, means for concurrently actuating said drum and said finger-base within predetermined limits, and means for independently actuating said finger-base.

7. The combination with a controller drum adapted to occupy an "off" position and a plurality of operative positions and provided with contact members respectively corresponding to said operative positions, and a set of control fingers for said drum, of a supporting member for said fingers that is adapted for rotative movement about said drum, and interlocking means associated with the drum and the supporting member for actuating said member toward the one or the other of said contact members upon the operation of said drum to the corresponding position.

8. The combination with a rotatable controller drum and a set of control fingers therefor, of a supporting member for said fingers rotatively mounted with respect to said drum, and means for concurrently actuating said drum and said supporting member.

9. The combination with a rotatable controller drum and a set of control fingers therefor, of a supporting member for said fingers rotatively mounted with respect to said drum, means for concurrently actuating said drum and said supporting member under predetermined conditions, and means for independently actuating said supporting member.

10. In a controller, the combination with a reversing drum adapted to occupy a forward, an "off" and a reverse position and provided with contact members respectively corresponding to the forward and the reverse positions, and a set of control fingers for said drum, of a finger-base for said fingers that is adapted for rotative movement about said drum, interlocking means associated with the drum and the finger base for actuating said finger-base toward the operative position finally occupied by the one or the other of said contact members upon the operation of said reversing drum in the corresponding direction, and means for separately actuating said finger-base under predetermined conditions.

11. In a controller, the combination with a main control drum adapted to occupy an "off" position and a plurality of operative positions, a reversing drum adapted to occupy a forward, an "off," and a reverse position and provided with contact members respectively corresponding to the forward and the reverse positions, and a plurality of sets of control fingers for said drums, of a stationary finger-base for the main drum control fingers, a finger-base for the reversing drum adapted for rotative movement about said drum and provided with a projecting boss, a biased locking member actuated by the reversing drum for preventing operation of the main drum when the reversing drum occupies its "off" position and having an arm adapted to engage said projecting boss for actuating the movable finger-base toward the operative position finally occupied by the one or the other of said contact members upon the operation of the reversing drum in the corresponding direction.

12. In a controller, the combination with a main control drum adapted to occupy an "off" position and a plurality of operative positions, a reversing drum adapted to occupy a forward, an "off" and a reverse position and provided with a supporting shaft and with contact members respectively corresponding to the forward and the reverse position, and a plurality of sets of control fingers for said drums, of a stationary finger-base for the main drum control fingers, a rotatable finger-base for the reversing drum control fingers having a plurality of apertured arms through which said shaft loosely extends and biased to a position wherein the fingers are out of contact with either of said contact members, a boss disposed on one of said arms, a notched member secured to said shaft and having a plurality of notches respectively corresponding to the various positions of the reversing drum, a tripple-armed interlocking member biased to have one end engage said notched members, having the other end arm adapted to lock the main drum in the "off" position when the reversing drum occupies its "off" position, and having the intermediate arm adapted to engage said boss for actuating said rotatable finger-base toward the operative position finally occupied by the one or the other of said contact members upon the operation of the reversing drum in the corresponding direction.

13. A controller comprising a main control drum adapted to occupy an "off" and a plurality of operative positions, a reversing drum adapted to occupy a forward, an "off," and a reversing position and provided with contact members respectively corresponding to the operative positions, a plurality of operating handles and sets of control fingers for the drums, a fluid-pressure controlling member, a supporting member for the reversing drum control fingers adapted for rotative movement about said drum, means mechanically associated with the handle of the main control drum for causing the reversing drum control fingers to break the controller circuit when the said handle assumes a predetermined position, means dependent upon the contact-breaking for operating said fluid-pressure controlled member, and interlocking means associated with the reversing drum and said supporting member for actuating said member toward the operative position finally occupied by the one or the other of said contact members upon the operation of the reversing drum in the corresponding direction.

14. A controller comprising a plurality of contact-making drums the first of which is adapted to assume an "off" position and a plurality of operative positions, a plurality of operating handles and sets of control fingers for the drums, a fluid-pressure controlling member, means mechanically associated with the handle of one of said drums for causing the electrical contact on the other drum to be broken upon a predetermined movement of said handle when said first drum occupies any operative position, means dependent upon the contact-breaking for thereupon operating said fluid-pressure controlling member, and means secured to said first means for preventing the operation of said member when said first drum occupies its "off" position.

15. A controller comprising a main control drum adapted to occupy an "off" position and a plurality of operative positions, a supporting shaft therefor, a reversing drum, a plurality of sets of control fingers for said drums, a stationary finger-base for the main drum control fingers, a finger-base for the reversing drum control fingers adapted to rotate about the drum, means for biasing said rotatable finger-base to an "off" or electrically inoperative position, an operating handle attached to the main drum shaft, a sleeve disposed intermediate said main drum and said handle, means for upwardly biasing said sleeve and said handle, means secured to said sleeve for moving said rotatable finger-base to an electrically operative position upon the application of downward pressure to said handle and initial actuation of the main drum, means actuated by upward movement of said sleeve when the main drum occupies any operative position to allow said rotatable finger-base to return to its biased position, means secured to said finger-base for thereupon operating said fluid-pressure controlling member, and a cam surface secured to said sleeve for preventing the operation of said member when the main drum occupies its "off" position.

16. A controller comprising a plurality of contact-making drums severally adapted to assume "off" positions and a plurality of operative positions, a plurality of operating handles and sets of control fingers for the drums, a fluid-pressure controlling member, a finger-base for one set of control fingers adapted to rotate about the corresponding drum, mechanical interlocking means associated with the drums for preventing predetermined relative movement thereof when the drums occupy their "off" positions, means mechanically associated with the handle of one of said drums for causing the electrical contact on the other drum to be broken when both drums occupy any operative position, means dependent upon the contact-breaking for thereupon operating said fluid-pressure controlling member, and means secured to said rotatable finger-base to engage said interlocking means and prevent operation of said member when both drums occupy their "off" positions.

17. A controller comprising a main control drum and a reversing drum severally adapted to assume "off" positions and a plurality of operative positions, a plurality of sets of control fingers for said drums, a fluid-pressure controlling member, a stationary finger-base for the main drum control fingers, a finger-base for reversing drum control fingers adapted to rotate about the drum, means for biasing said rotatable finger-base to an "off" or electrically inoperative position, an operating handle attached to the main drum shaft, a sleeve disposed intermediate said main drum and said handle, means for upwardly biasing said sleeve and said handle, means secured to said sleeve for moving said rotatable finger base to an electrically operative position upon the application of downward pressure to said handle and initial actuation of the main drum, means actuated by upward movement of said sleeve when the main drum occupies any operative position to allow the rotatable finger-base to return to its biased position, means secured to said finger-base for thereupon operating said fluid-pressure controlling member, mechanical interlocking members actuated by movement of the reversing drum for preventing movement of the main drum when both drums occupy their "off" positions, and a boss secured to said rotatable finger base to engage one of said interlocking members and prevent operation of said fluid-pressure controlling member when both drums occupy their "off" positions.

18. A controller comprising a main control drum, a reversing drum, a plurality of sets of control fingers and operating handles for said drums, a stationary finger-base for the main drum control fingers, a finger-base for the reversing drum control fingers, adapted to rotate about the drum and biased to a predetermined position, a sleeve disposed intermediate the main drum and its handle, means for locking the rotatable finger-base in an electrically operative position upon predetermined movement of the main drum handle, a fluid-pressure controlling member, and a relatively light spring for tripping said locking means under predetermined operating conditions, whereby said rotatable finger-base is returned to its biased position to operate said fluid pressure controlled member.

19. A controller comprising a main control drum, a reversing drum, a plurality of sets of control fingers and operating handles for said drums, a stationary finger-base for the main drum control fingers, a finger-base for the reversing drum control fingers adapted to rotate about the drum and biased to a predetermined position, a sleeve disposed intermediate the main drum and its handle, means secured to said sleeve for moving said finger-base to an electrically operative position upon the application of downward pressure to, and initial rotation of, the main drum handle, a pivotally-mounted lever biased to thereupon engage the rotatable finger-base and lock it in said operative position, and a spring of a capacity sufficient only to trip said lever and raise said sleeve and said handle when the pressure on the handle is released, a fluid-pressure controlling member, and means associated with the rotatable finger-base for operating said member upon the upward movement of said handle.

20. A controller comprising a plurality of contact-making drums, a plurality of sets of control fingers therefor, means biased to retain one of said sets in an operative position, means tending to actuate that set to an inoperative position, and spring-actuated means associated with the other drum for overcoming the biasing means and causing the electrical contact on the first drum to be broken by said tending means under predetermined conditions.

21. A controller comprising a control drum and a reversing drum, a plurality of sets of control fingers therefor, a lever biased to retain the reversing-drum set of control fingers in an operative position, means tending to actuate said set to an inoperative position and spring-actuated means for tripping said lever and causing the electrical contact on the reversing drum to be broken by said tending means under predetermined operating conditions.

22. A controller comprising a control drum and a reversing drum severally provided with operating handles, a plurality of sets of control fingers for said drums, means dependent upon an initial downward and rotative movement of the control-drum handle for actuating the reversing-drum set of control fingers to an operative position, a lever biased to retain the reversing-drum set of control fingers in said operative position, a spring tending to actuate said set to an inoperative position, and means dependent upon an upward movement of the control-drum handle for tripping said lever and causing the electrical contact on the reversing drum to be broken by said spring.

23. The combination with a movable controller drum provided with an operating shaft, and a set of control fingers for said drum, of a longitudinally-extending finger-base for said fingers that is rotatively supported on said shaft near both ends of said drum.

In testimony whereof, I have hereunto subscribed my name this 15th day of Apr. 1914.

ARTHUR J. HALL.

Witnesses:
G. R. IRWIN,
B. B. HINES.

Copies of this patent may be obtained for five cents each, by addressing the "Commissioner of Patents, Washington, D. C."